(12) United States Patent
Kim et al.

(10) Patent No.: US 11,531,722 B2
(45) Date of Patent: Dec. 20, 2022

(54) ELECTRONIC DEVICE AND CONTROL METHOD THEREFOR

(71) Applicant: SAMSUNG ELECTRONICS CO., LTD., Suwon-si (KR)

(72) Inventors: Youngjun Kim, Suwon-si (KR); Chanmuk Kim, Suwon-si (KR); Dohyoung Jung, Suwon-si (KR); Kwanghyun Koh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/284,401

(22) PCT Filed: Jul. 2, 2019

(86) PCT No.: PCT/KR2019/008028
§ 371 (c)(1),
(2) Date: Apr. 9, 2021

(87) PCT Pub. No.: WO2020/122339
PCT Pub. Date: Jun. 18, 2020

(65) Prior Publication Data
US 2021/0334321 A1 Oct. 28, 2021

(30) Foreign Application Priority Data
Dec. 11, 2018 (KR) .......................... 10-2018-0159246

(51) Int. Cl.
*G06F 16/955* (2019.01)
*G06F 16/9535* (2019.01)
(Continued)

(52) U.S. Cl.
CPC ...... *G06F 16/9566* (2019.01); *G06F 11/3438* (2013.01); *G06F 16/285* (2019.01); *G06F 16/288* (2019.01); *G06F 16/955* (2019.01); *G06F 16/9535* (2019.01); *G06F 16/9538* (2019.01); *G06F 40/284* (2020.01); *G06K 9/6256* (2013.01); *G06N 20/00* (2019.01)

(58) Field of Classification Search
CPC ... G06N 20/00; G06F 16/9566; G06F 16/285; G06F 16/288
See application file for complete search history.

(56) References Cited

U.S. PATENT DOCUMENTS 7,886,047 B1 2/2011 Potluri
8,078,625 B1 12/2011 Zhang et al.
(Continued)

FOREIGN PATENT DOCUMENTS

CN 103235824 A 8/2013
EP 2756432 3/2013
(Continued)

OTHER PUBLICATIONS

International Search Report (PCT/ISA/210) dated Oct. 17, 2019 issued by the International Searching Authority in International Application No. PCT/KR2019/008026.
(Continued)

*Primary Examiner* — Kyung H Shin
(74) *Attorney, Agent, or Firm* — Sughrue Mion, PLLC

(57) ABSTRACT

The present disclosure provides an electronic device and a control method therefor. An electronic device of the present disclosure may comprise a memory including at least one command, and a processor which is connected to the memory so as to control the electronic device, wherein the processor executes at least one instruction, so as to classify a uniform resource locator (URL) corresponding to at least one website accessed by a user during a preconfigured period into at least one segment, classify URLs according to a plurality of categories, on the basis of the at least one segment and a learned classification model, and determine, among the plurality of categories, a category of a website preferred by the user, on the basis of the user's website access history during the preconfigured period, an access history with respect to the at least one website, and a result
(Continued)

of the classification. The electronic device of the present disclosure may use a rule-based model or an artificial intelligence model learned according to at least one of a machine learning, a neural network, or a deep learning algorithm.

9 Claims, 15 Drawing Sheets

(51) Int. Cl.
*G06F 16/9538* (2019.01)
*G06F 40/284* (2020.01)
*G06F 11/34* (2006.01)
*G06K 9/62* (2022.01)
*G06F 16/28* (2019.01)
*G06N 20/00* (2019.01)

(56) References Cited

U.S. PATENT DOCUMENTS

| 9,659,239 | B2 | 5/2017 | Matsunaga |
| 2011/0270691 | A1 | 11/2011 | Park |
| 2017/0091303 | A1* | 3/2017 | Rashid ............... G06N 20/00 |
| 2017/0351767 | A1 | 12/2017 | Suzuki et al. |

FOREIGN PATENT DOCUMENTS

| JP | 2010123000 A | 6/2010 |
| JP | 2012256268 A | 12/2012 |
| JP | 2016091166 A | 5/2016 |
| JP | 2017059205 A | 3/2017 |
| KR | 1020030016037 A | 2/2003 |
| KR | 1020040040145 A | 5/2004 |
| KR | 100901960 B1 | 6/2009 |
| WO | 2009/116723 A1 | 9/2009 |
| WO | 2013039832 A1 | 3/2013 |
| WO | 2016111065 A1 | 7/2016 |
| WO | 2017/052953 A1 | 3/2017 |

OTHER PUBLICATIONS

Written Opinion (PCT/ISA/237) dated Oct. 17, 2019 issued by the International Searching Authority in International Application No. PCT/KR2019/008028.
Communication dated Sep. 21, 2021, issued by the European Patent Office in counterpart European Application No. 19895840.7.

* cited by examiner

FIG. 3A

| Prob(URL,cat) | URL-A | URL-B | URL-C |
|---|---|---|---|
| cat-a | 0.849 | 0.116 | 0.721 |
| cat-b | 0.247 | 0.914 | 0.679 |

~310

| Prob(URL,cat) | URL-A | URL-B | URL-C |
|---|---|---|---|
| cat-a | 0.849 | 0.000 | 0.721 |
| cat-b | 0.000 | 0.914 | 0.679 |

|      | URL-A | URL-B | URL-C |
|------|-------|-------|-------|
| ID-1 | 86    | 11    | 64    |
| ID-2 | 7     | 97    | 53    |

| Freq1(URL,ID) | URL-A | URL-B | URL-C |
|---|---|---|---|
| ID-1 | 0.534 | 0.068 | 0.398 |
| ID-2 | 0.045 | 0.618 | 0.338 |

~340

| Freq2(ID,URL) | URL-A | URL-B | URL-C |
|---|---|---|---|
| ID-1 | 0.925 | 0.102 | 0.547 |
| ID-2 | 0.075 | 0.898 | 0.453 |

| Score(cat-a) | URL-A | URL-B | URL-C |
|---|---|---|---|
| ID-1 | 0.419 | 0.000 | 0.157 |
| ID-2 | 0.003 | 0.000 | 0.110 |

~360

| Score(cat-b) | URL-A | URL-B | URL-C |
|---|---|---|---|
| ID-1 | 0.000 | 0.006 | 0.148 |
| ID-2 | 0.000 | 0.507 | 0.104 |

~370

| Score | cat-a | cat-b |
|---|---|---|
| ID-1 | 0.576 | 0.154 |
| ID-2 | 0.113 | 0.611 |

~380

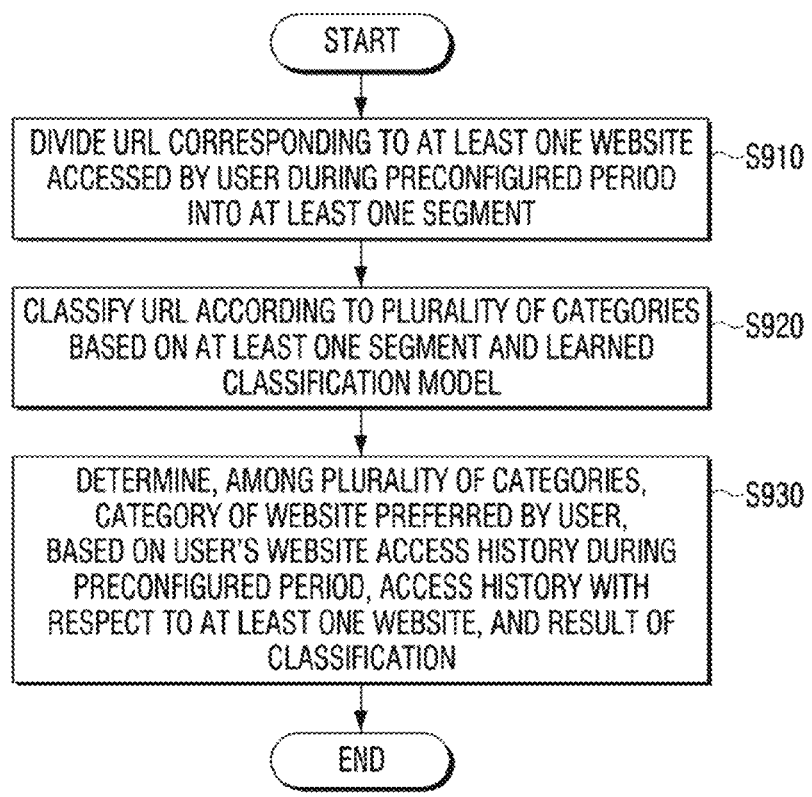

ELECTRONIC DEVICE AND CONTROL METHOD THEREFOR

This is a 371 National Stage of International Application No. PCT/KR2019/008028 filed Jul. 2, 2019, and claims priority from Korean Patent Application No. 10-2018-0159246 filed Dec. 11, 2018, the entire disclosures of which are hereby incorporated by reference.

TECHNICAL FIELD

The disclosure relates generally to an electronic apparatus and a control method thereof. More particularly, the disclosure relates to an electronic apparatus that determines a user's preference in order to provide user-customized information, and a control method thereof.

BACKGROUND ART

Due to the recent development of electronic technology, a user of a user terminal can access a website through a portable user terminal, regardless of location or time. Accordingly, it has become possible to analyze a website accessed by a user to determine the user's preference, and to provide customized advertisements for each user or to establish a marketing strategy according to the user's preference.

In order to analyze the website accessed by the user and determine the user's preference, there is a method of classifying categories of the website by extracting words from text included in a title and content of the website accessed by the user.

However, the amount of data to be processed is determined when categorizing the categories according to the number of texts included in the website, and eventually there is a problem that the time or cost required to process the data increases as the number of texts increases. In particular, when the processed data is large, there is a problem that an accuracy of classifying the categories is lowered.

In addition, if the website does not contain text, such as the website contains only images, there is a problem in that it is impossible to classify the categories of the website, such that deviation occurs for each website.

Meanwhile, when a plurality of words is included in the text, an n-gram algorithm may be used to extract the plurality of words from the text. At this time, assuming that the number of texts (or columns of text) is m (m is an arbitrary natural number), a column of text from 1 to n (n is an arbitrary natural number) may be acquired as a token, a column from 2 to n+1 may be acquired as a token . . . , a column from m−n+1 to m may be acquired as a token, and it may be an algorithm that extracts a word having meaning from the acquired token.

However, in the case of the n-gram algorithm, as the number of texts increases or the number of n combinations increases, the number of acquired tokens increases, and thus, there is a problem that time or cost for extracting words from the tokens may increase.

DETAILED DESCRIPTION OF THE INVENTION

Technical Problem

An object of the disclosure is to provide an electronic apparatus for identifying a user's preference by classifying URL of a website accessed by the user into a category, and a control method thereof.

Technical Solution

According to an embodiment of the disclosure, an electronic apparatus includes a memory including at least one command, and a processor configured to be connected to the memory so as to control the electronic apparatus, wherein the processor is configured to execute at least one instruction, so as to classify a uniform resource locator (URL) corresponding to at least one website accessed by a user during a preconfigured period into at least one segment, classify URLs according to a plurality of categories, based on at least one segment and a learned classification model, and determine, among the plurality of categories, a category of a website preferred by the user, based on the user's website access history during the preconfigured period, an access history with respect to the at least one website during the preconfigured period, and a result of the classification.

The processor may be configured to classify the URL corresponding to the at least one website respectively into at least one segment, respectively, based on corpus.

The processor may be configured to acquire a feature value with respect to the at least one segment, use the feature value as an input data with respect to the learned classification model to acquire a probability value that the URLs belongs to the plurality of categories, and determine, among the plurality of categories, the category of the website preferred by the user, based on the user's website access history during the preconfigured period, the access history of the user who access the web site during the preconfigured period, and the probability value.

The processor may be configured to calculate, with respect to the respective one or more URLs, a ratio of the number of accesses of the user who has accessed a website corresponding to a specific URL to the number of accesses of the user who has accessed the at least one website during the preconfigured period as the access history with the respect to the website of the user.

The processor may be configured to calculate, with respect to the respective one or more websites, a ratio of the number of accesses of the user who has accessed the website to the number of accesses of all users who have accessed the website during the predetermined period as the access history with respect to the at least one website.

The processor may be configured to calculate user's preference with respect to each of the plurality of categories based on the user's website access history during the preconfigured period, the access history with respect to the at least one website, and the result of the classification, and determine the category of the website preferred by the user based on the calculated preference.

The processor may be configured to provide information related to the category of the website preferred by the user.

The learned classification model may be configured to be learned using information on the plurality of URLs and a category to which each of the plurality of URLs belongs as learning data.

According to an embodiment of the disclosure, a method for controlling an electronic apparatus includes classifying a uniform resource locator (URL) corresponding to at least one website accessed by a user during a preconfigured period into at least one segment, classifying URLs according to a plurality of categories, based on at least one segment and a learned classification model; and determining, among the plurality of categories, a category of a website preferred by the user, based on the user's website access history during the preconfigured period, an access history with respect to the at least one website during the preconfigured period, and a result of the classification.

The dividing may include classifying the URL corresponding to the at least one website respectively into at least one segment, respectively, based on corpus.

The determining may include acquiring a feature value with respect to the at least one segment, using the feature value as an input data with respect to the learned classification model to acquire a probability value that the URLs belongs to the plurality of categories, and determining, among the plurality of categories, the category of the website preferred by the user, based on the user's website access history during the preconfigured period, the access history with respect to the website of the user during the preconfigured period, and the probability value.

The method may further include calculating, with respect to the respective one or more URLs, a ratio of the number of accesses of the user who has accessed a website corresponding to a specific URL to the number of accesses of the user who has accessed the at least one website during the preconfigured period as the access history with the respect to the website of the user.

The method may further include calculating, with respect to the respective one or more websites, a ratio of the number of accesses of the user who has accessed the website to the number of accesses of all users who have accessed the website during the predetermined period as the access history with respect to the at least one website.

The determining the category may include calculating user's preference with respect to each of the plurality of categories based on the user's website access history during the preconfigured period, the access history with respect to the at least one website, and the result of the classification, and determining the category of the website preferred by the user based on the calculated preference.

The method may further include providing information related to the category of the website preferred by the user.

The learned classification may be configured to be learned using information on the plurality of URLs and a category to which each of the plurality of URLs belongs as learning data.

Effect of the Invention

According to various embodiments of the disclosure as described above, an electronic apparatus for determining a user's preference by classifying URLs of a website accessed by the user into categories, and a method for controlling thereof may be provided.

In addition, the electronic apparatus and the method for controlling thereof according to an embodiment of the disclosure may improve processing speed and reduce resource consumption when classifying a website accessed by the user into a specific category. Accordingly, an electronic apparatus capable of determining the user's preference more quickly and the control method thereof may be provided.

In addition, the electronic apparatus and the method for controlling thereof according to an embodiment of the disclosure may reduce an error caused by a difference in content of the website when classifying the website accessed by the user into a specific category. Accordingly, the electronic apparatus capable of providing more accurate user-customized information and the method for controlling thereof may be provided.

BRIEF DESCRIPTION OF DRAWINGS

FIGS. 3A to 3D are views illustrating a method of calculating a score according to an embodiment;

FIG. 9 is a view illustrating a flowchart according to an embodiment.

MODE FOR IMPLEMENTING THE DISCLOSURE

Figure 1:
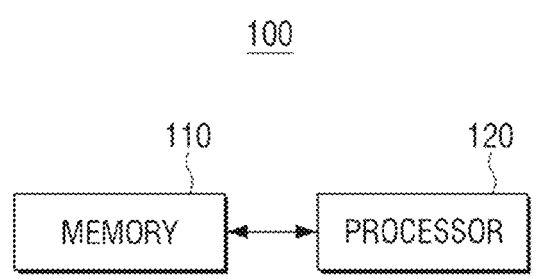
FIG. 1 is a block diagram illustrating an electronic apparatus according to an embodiment.

In describing exemplary embodiments, detailed description of relevant known functions or components may be omitted if it would obscure the description of the subject matter. In addition, the exemplary embodiments may be changed in various forms, and therefore, the technical scope is not limited to the following exemplary embodiments. Rather, these exemplary embodiments are provided to make the disclosure thorough and complete.

However, it should be understood that the disclosure is not limited to the specific embodiments described hereinafter, but includes various modifications, equivalents, and/or alternatives of the embodiments of the disclosure. In relation to explanation of the drawings, similar drawing reference numerals may be used for similar constituent elements.

The expression "1", "2", "first", or "second" as used herein may modify a variety of elements, irrespective of order and/or importance thereof, and only to distinguish one element from another. Accordingly, without limiting the corresponding elements.

In the description, the term "A or B", "at least one of A or/and B", or "one or more of A or/and B" may include all possible combinations of the items that are enumerated together. For example, the term "A or B" or "at least one of A or/and B" may designate (1) at least one A, (2) at least one B, or (3) both at least one A and at least one B.

The singular expression also includes the plural meaning as long as it does not differently mean in the context. The terms "include", "comprise", "is configured to," etc., of the description are used to indicate that there are features, numbers, steps, operations, elements, parts or combination thereof, and they should not exclude the possibilities of combination or addition of one or more features, numbers, steps, operations, elements, parts or a combination thereof.

When an element (e.g., a first element) is "operatively or communicatively coupled with/to" or "connected to" another element (e.g., a second element), an element may be directly coupled with another element or may be coupled through the other element (e.g., a third element). On the other hand, when an element (e.g., a first element) is "directly coupled with/to" or "directly connected to" another element (e.g., a second element), an element may not be existed between the other element.

In the description, the term "configured to" may be changed to, for example, "suitable for", "having the capacity to", "designed to", "adapted to", "made to", or "capable of" under certain circumstances. The term "configured to (set to)" does not necessarily mean "specifically designed to" in a hardware level. Under certain circumstances, the term "device configured to" may refer to "device capable of" doing something together with another device or components. For example, "a processor configured (or set) to perform A, B, and C" may mean a dedicated processor (e.g., embedded processor) for performing the above operation, or a generic-purpose processor (e.g., CPU or application processor) capable of performing the above operations by executing one or more software programs stored in a memory.

An electronic apparatus according to various exemplary embodiments of the disclosure may include, for example, at least one of a smart phone, a tablet PC (Personal Computer), a mobile phone, a video phone, an e-book reader, a desktop PC (Personal Computer), a laptop PC (Personal Computer), a net book computer, a workstation, a server, a PDA (Personal Digital Assistant), a PMP (Portable Multimedia Player), an MP3 player, a mobile medical device, a camera, and a wearable device. According to various embodiments, wearable devices may include at least one of accessories (e.g. watches, rings, bracelets, anklets, necklaces, glasses, contact lenses, or head-mounted-devices (HMD)), fabrics or clothing (e.g. electronic clothing), a body attachment type (e.g., a skin pad or a tattoo), or a bio-implantable circuit.

In addition, according to an embodiment, the methods according to various embodiments described above may include at least one of a television, a digital video disk (DVD) player, audio, refrigerator, air conditioner, cleaner, oven, microwave, washing machine, air purifier, set top box, home automation control panel, security control panels, media boxes (e.g., the Samsung HomeSync™, Apple the TV™, or Google the TV™), a game console (e.g., Xbox™, the PlayStation™ s), electronic dictionaries, electronic keys, cameras, or a digital photo frame.

In another embodiment, the electronic apparatus may include at least one of various medical devices (e.g., various portable medical measurement devices (such as a blood glucose meter, heart rate monitor, blood pressure meter, body temperature meter, etc.,), magnetic resonance angiography (MRA), magnetic resonance imaging (MRI), computed tomography (CT), camera, or ultrasound, etc.), navigation device, global navigation satellite system (GNSS), event data recorder (EDR), flight data recorder (FDR), automotive infotainment device, marine electronic equipment (e.g., navigational devices for ships, gyro compasses, etc.), avionics, security devices, head units for vehicles, industrial or household robots, drones, ATMs in financial institutions, point-of-sale (POS) for stores sales, or Internet of Things devices (e.g., light bulbs, various sensors, sprinkler devices, fire alarms, thermostats, street lights, toasters, exercise equipment, hot water tanks, heaters, boilers, etc.).

According to another embodiment, the electronic may include at least one of furniture or a part of building/structure, an electronic board, an electronic signature receiving device, a projector, or various measuring devices (e.g., water, electricity, gas, or radio wave measuring devices). In various embodiments, the electronic apparatus may be a combination of one or more of the above-described devices. In a certain embodiment, the electronic apparatus may be a flexible electronic apparatus. Further, the electronic apparatus according to the embodiments of the disclosure is not limited to the above-described devices, but may include new electronic apparatuses in accordance with the technical development.

The electronic apparatus according to an embodiment of the disclosure may determine a category of a website by extracting a word having a dictionary meaning from text included in a URL (Uniform Resource Locator) of a web site accessed by the user in order to analyze the website accessed by the user and determine the user's preference. In this case, the category may be an item for classifying the website by field, topic, etc. to determine the user's preference. For example, the plurality of categories may be items such as soccer, IT, news, economy, or the like.

Here, the URL may include text as an address of a website (or web page). In general, the text included in the URL may be represented as a source used when categorizing a category in that it indicates subject, purpose, and characteristics of the web site.

Hereinafter, various example embodiments of the disclosure will be described in greater detail with reference to the accompanying drawings.

FIG. 1 illustrates a block diagram of an electronic apparatus according to an embodiment.

Referring to FIG. 1, the electronic apparatus 100 includes a memory 110 and a processor 120. However, configurations of the electronic apparatus 100 shown in FIG. 1 are exemplary configurations for implementing the embodiments of the disclosure, and hardware/software configurations of a level that are obvious to those skilled in the art may be additionally included in the electronic apparatus 100, and its specific content will be described below with reference to FIG. 8.

The memory 110 may include at least one command. Specifically, the memory 110 may include at least one command (or data) that causes at least one other component (e.g., the processor 120) of the electronic apparatus 100 to operate. In addition, the memory 110 may include at least one instruction related to an artificial intelligence model (hereinafter referred to as a learned classification model) learned to classify a uniform resource locator (URL) into a category.

In the memory 110, URLs may be classified according to a plurality of categories, and probability values for each of the URLs and the plurality of categories corresponding to the URLs may be stored, and may be updated.

The memory 110 may be implemented as a non-volatile memory, a volatile memory, a flash memory, a hard disk drive (HDD) or a solid state drive (SDD). The memory 110 may be accessed by the processor 120, and perform readout, recording, correction, deletion, update, and the like, on data by the processor 120. According to an exemplary embodiment, the term "memory" as used herein may include a memory 110, a ROM (not illustrated), and a RAM (not illustrated) within the processor 120, or a memory card (not illustrated) mounted on the electronic apparatus 100 (not illustrated) (e.g., micro SD card, memory stick).

The processor 120 may control the overall operation of the electronic apparatus 100. The processor 120 may control an overall operation of the electronic apparatus 100 by using various types of programs stored in the memory 110.

The processor 120 may execute at least one command so as to divide the URL corresponding to at least one website accessed during a preconfigured period into at least one segment. In this case, the preconfigured period is variously configured periods such as 30 minutes, 4 hours, 3 days, 2 weeks, 1 month, etc., and may be changed even after the preconfigured period. Accordingly, resource management may be achieved by adjusting the amount of input data or processed data.

In this case, the segment may be a word included in corpus. Here, the corpus refers to language materials in which texts are collected in a computer-readable form for language processing. The corpus is used to perform statistical analysis and hypothesis testing, or to check an occurrence of language rules within a specific language domain and to justify those rules. The corpus may include words (including words having a dictionary meaning, proper nouns, etc.) and context information (e.g., frequency of use of words, words used together, etc.).

As an embodiment, the processor 120 may classify URLs corresponding to each of at least one website into at least one segment, respectively, based on a corpus.

For example, assuming that the URL is [samsungnetwork] and the corpus includes [samsung], [net], [work], and [network], the processor 120 may classify the URLs into segments such as [samsung], [net], and [work], or into segments such as [samsung] and [network].

The processor 120 may classify the URLs according to a plurality of categories based on at least one segment and the learned classification model.

Specifically, when the processor 120 inputs input data based on at least one segment corresponding to the URL into the learned classification model, the processor 120 may acquire at least one category (or probability value) to which the URL belongs among a plurality of categories, and acquire a result of the classification acquired by classifying the URL into categories according to the acquired category. Here, the result of classification may refer to a result value in which a probability value is filtered by a threshold value. For example, a probability value smaller than the threshold value may be treated as 0.

In this case, the learned classification model may be an artificial intelligence model that has been learned to classify into a category to which the URL belongs from a segment (or feature value) corresponding to the URL or to acquire a probability value belonging to the category, and may be implemented as a neural network model, a genetic model, and a probability statistical model.

Meanwhile, the learned classification model may be learned using information on a plurality of URLs and a category to which each of the plurality of URLs belongs as learning data. In this case, the information on the plurality of categories to which the URLs belong is information that uses logistic regression, support vector machine (SVM), or the like for each category of the open directory project (ODP), or a preconfigured information that the website (or URL) belongs to a specific category according to a method such as crowdsourcing, and may include a probability value that the website (or URL) belongs to a specific category. For example, the probability value that the URL belongs to the specific category (e.g., one of 0 to 1) may be 1, but in the case of an auxiliary category with relatively low relevance among the plurality of categories to which the URL belongs, the value may be a less than 1

As an embodiment, the processor 120 may acquire a feature value for at least one segment, and use the feature value as input data for a learned classification model to acquire a probability value that the URL belongs to the plurality of categories.

Specifically, in order to use at least one segment as an input value to the learned classification model, the processor 120 may use feature extraction to convert at least one segment into one feature value corresponding to a point in space of n-dimensional (n is a natural number) and acquire a feature value. In this case, the processor 120 may convert one or a plurality of segments into one feature value (a feature value corresponding to the URL) (that is, one feature value for each URL may be acquired).

In this case, the processor 120 may use the feature value corresponding to the URL as input data for the learned classification model so as to acquire a probability value that the URL belongs to each of the plurality of categories. As an example, a probability value in which the URL belongs to each of the plurality of categories may be one of 0 to 1.

Further, the processor 120 may compare the probability value that the URLS belong to each of the plurality of categories with a threshold value to classify the URLs into a category having the probability value greater than or equal to the threshold value among the plurality of categories. In this case, the threshold value may represent a degree of a criterion for classifying the URLs into categories, and may refer to sensitivity. For example, the threshold value may be configured to as 0.5, and the threshold value configured through the input unit (not shown) of the electronic apparatus 100 may be changed.

In this case, when the URLs are classified as categories, the processor 120 may store the classified URL and probability values for the categories corresponding to the URLs in the memory 110 or update the URL.

The processor 120 may determine, among a plurality of categories, a category of a website preferred by the user based on the user's website access history, access history to at least one website, and a result of classification during a preconfigured period.

For this operation, the processor 120 may receive the number of times the user accessed the website through a communicator (not shown) of the electronic apparatus 100, the date and time the user accessed the website, a URL corresponding to the website accessed by the user, user information for distinguishing the user from an external electronic apparatus.

In this case, the processor 120 may calculate the user's preference for each of the plurality of categories based on the user's website access history during the preconfigured period, the access history to at least one website during the preconfigured period, and the result of the classification, and determine a category of the website referred by the user.

As an embodiment, the processor 120 may determine, among the plurality of categories, a category of website preferred by the user, based on the user's website access history during the preconfigured period, the access history of the user who accessed to the website during the preconfigured period, and a probability value.

In this case, the probability value is a probability value that the URL belongs to a category, and may mean a probability value equal to or greater than a threshold value. In other words, a probability value smaller than the threshold value may be processed as 0.

In one embodiment, the processor 120, for each of the at least one URL, a ratio of the number of times the user accesses the website corresponding to a specific URL to the number of times the user accesses the at least one website during a preconfigured period may be calculated as the user's website access history.

For example, the processor 120 may use (1) of Equation 1 below, for a URL corresponding to a specific website A, to calculate a ratio of the number of times a first user accessed the specific website A among all websites accessed during the preconfigured period as the first user's website access history.

[Equation 1]

$$Freq1(ID\text{-}1, URL\text{-}A) = \frac{Count(ID\text{-}1, URL\text{-}A)}{Count(ID\text{-}1)} \quad (1)$$

$$Freq1(ID\text{-}1, URL\text{-}A) + \\ Freq1(ID\text{-}1, URL\text{-}B) + \ldots + Freq1(ID\text{-}1, URL\text{-}N) = 1 \quad (2)$$

Here, Count (ID-1) may represent the number of times the first user ID-1 has accessed the entire website during a preconfigured period based on the first user ID-1, which is a specific user, and Count (ID-1, URL-A) may refer to the number of times the first user ID-1 accessed the website A (URL-A).

Meanwhile, the website access history of the first user ID-1 to the website A (URL-A) may be Freq1 (ID-1, URL-A) as shown in (1) of Equation 1, and the website access history for the entire website of the user ID-1 may be "1" as shown in (2) of Equation 1 below.

In one embodiment, the processor 120 calculates the ratio of the number of times the user has accessed the website to the number of accesses of all users who have accessed the website during a preconfigured period for each of the at least one website. It can be calculated from the history of access to the site.

For example, the processor 120 may use (1) of Equation 2 below, for a URL corresponding to a specific website, to calculate the ratio of the number of times a specific user accesses among all users who have accessed the specific website during a predetermined period as the access history to the at least one website.

[Equation 2]

$$Freq2(URL\text{-}A, ID\text{-}1) = \frac{Count(URL\text{-}A, ID\text{-}1)}{Count(URL\text{-}A)} \quad (1)$$

$$Freq2(URL\text{-}A, ID\text{-}1) + \\ Freq2(URL\text{-}A, ID\text{-}2) + \ldots + Freq2(URL\text{-}A, ID\text{-}N) = 1 \quad (2)$$

Here, Count(URL-A) may represent the number of times that all users who have accessed website A(URL-A) for a preconfigured period based on the specific website A(URL-A), and Count(URL-A) A, ID-1) may refer to the number of times the first user ID-1 have accessed the website A(URL-A).

Meanwhile, the website access history of the first user (ID-1) to website A(URL-A) may be Freq2(URL-A, ID-1) as shown in (1) of Equation 2, and the website access history of all users to A(URL-A) may be "1" as shown in (2) of Equation 2.

In an embodiment, the processor 120 may calculate the user's preference for each of the plurality of categories based on the user's website access history, the access history to at least one website, and the result of the classification during a preconfigured period.

For example, the processor 120 may use Equation 3 below to calculate the first user's preference (or score) with respect to each of the plurality of categories based on the first user's website access history, the access history to at least one website, and the probability value.

$$Score(ID\text{-}1, Cat\text{-}a) = Freq1(ID\text{-}1, URL\text{-}A) \times Freq2(URL\text{-}A, ID\text{-}1) \times Prob(URL\text{-}A, Cat\text{-}a) + Freq1(ID\text{-}1, URL\text{-}B) \times Freq2(URL\text{-}B, ID\text{-}1) \times Prob(URL\text{-}B, Cat\text{-}a) + \ldots + Freq1(ID\text{-}1, URL\text{-}N) \times Freq2(URL\text{-}N, ID\text{-}1) \times Prob(URL\text{-}N, Cat\text{-}a)$$

[Equation 3]

Here, Freq1 (ID-1, URL-A) may represent the website access history of the first user ID-1 to website A(URL-A) among all websites of the first user ID-1, and Freq2(URL-A, ID-1) may represent the website access history of the first user ID-1 to the website A(URL-A) among all users who accessed the website A(URL-A).

In this case, Prob(URL-A, Cat-a) may represent a probability value when a probability value that the website A(URL-A) belongs to category a(Cat-a) is greater than or equal to a threshold value. For example, when a probability value "0.7" that website A(URL-A) belongs to category a(Cat-a) is greater than or equal to the threshold value (e.g., 0.5), then Prob(URL-A, Cat-a) may be "0.7", and when a probability value "0.2" that website B(URL-B) belongs to category a(Cat-a) is less than the threshold value (e.g., 0.5), Prob(URL-B, Cat-a) may be "0".

In this case, a preference Score(ID-1, Cat-a) may indicate a degree that the first user ID-1 prefers the category a(Cat-a) of the website.

The processor 120 may provide information related to the categories of the website preferred by the user.

According to various embodiments of the disclosure as described above, an electronic apparatus for determining the user's preference by classifying URLs of the website accessed by the user into categories, and a method for controlling thereof may be provided.

Figure 2:
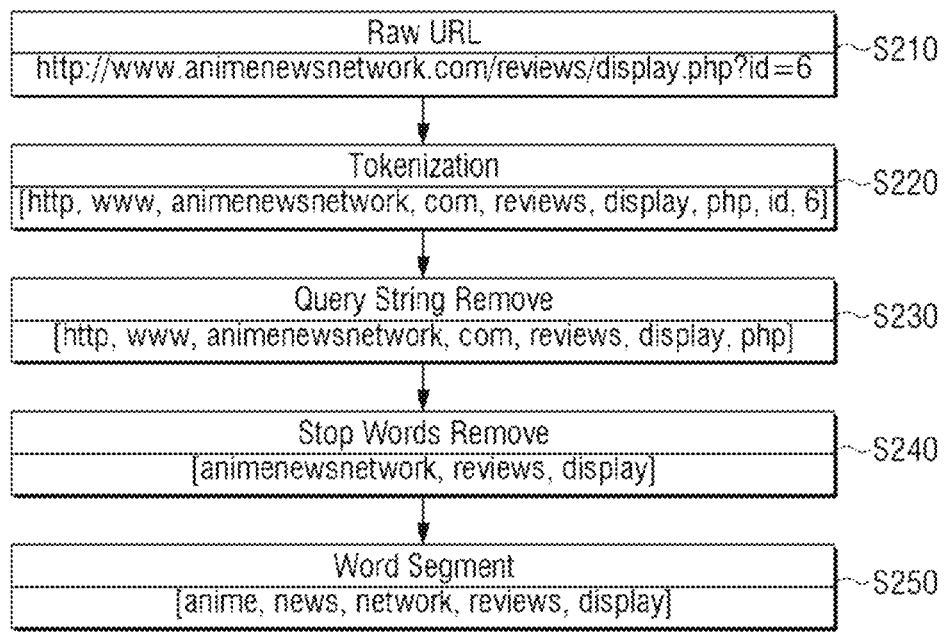
FIG. 2 is a view illustrating a method of classifying URLs into categories according to an embodiment.

FIG. 2 is a view illustrating a method of classifying URLs into categories according to an embodiment of the disclosure. Referring to FIG. 2, it is assumed that the URL accessed by the user is [http://www.animenewsnetwork.com/reviews/display.php ?id=6].

The processor 120 may receive a URL corresponding to a website accessed by the user from an external electronic apparatus through a communicator (not shown) of the electronic apparatus 100 (S210). In this case, the external electronic apparatus may be various electronic apparatuses such as a user terminal (e.g., PC, smartphone, tablet PC, laptop PC, PDA, etc.) or an external server, and transmit and receive various data by performing wired/wireless communication. Meanwhile, the user refers to the user of an external electronic apparatus, but is not limited thereto and may be interpreted as the user of the electronic apparatus 100 of the disclosure. For example, the processor 120 may receive a URL such as [http://www.animenewsnetwork.com/reviews/display.php ?id=6] corresponding to a website accessed by the user from the external electronic apparatus.

The processor 120 may acquire at least one token from the received URL based on a symbol included in the received URL (S220). Specifically, the processor 120 may acquire text other than the symbol as a separate token by classifying the received URL based on the location of the symbol. In this case, the symbol may include [/], [_], [-], [=], [:], [.], [?], etc. as a separator. For example, the processor 120 may divide the URL such as [http://www.animenewsnetwork.com/reviews/display.php?id=6] based on the location of symbol to acquire text other than the symbol such as [http], [www], [animenewsnetwork], [com], [reviews], [display], [php], [id], [6] as a token.

The processor 120 may remove a query string from at least one token (S230). In this case, the query string may refer to a part of the URL for transmitting data. For example, the processor 120 may remove query strings such as [id] and [6].

The processor 120 may remove a predetermined word from at least one token from which the query string has been removed (S240). In this case, the preconfigured word may refer to text commonly used in the URL regardless of theme, purpose, and feature of the website, and may be changed even after being determined. For example, the processor 120 may remove the preconfigured words [http], [www], [com], and [php] from at least one token from which the query string has been removed.

The processor 120 may divide the query string and the token from which the preconfigured word has been removed into at least one segment based on corpus (S250).

Specifically, the processor 120 may detect at least one word from a token from which the query string and the preconfigured word are removed based on corpus, and divide the query string and the token from which the preconfigured word has been removed into at least one segment such that one detected word corresponds to one segment. In this case, a word having a dictionary meaning may be included in word dictionary, and the word dictionary may be previously stored in the memory 110 of the electronic apparatus 100 or in an external electronic apparatus.

The processor 120 may divide a token [animenewsnetwork] in which a plurality of words having a dictionary meaning, among tokens [animenewsnetwork], [reviews], and [display] from which a query string and a predetermined word have been removed, into three segments, [anime], [news], and [network]. Accordingly, the processor 120 may acquire segments [anime], [news], [network], [reviews], and [display] from the URL of the web page.

The electronic apparatus and the method for controlling thereof, according to an embodiment of the disclosure as described above can improve processing speed and reduce resource consumption when a website accessed by the user is classified into a specific category. Accordingly, an electronic apparatus capable of determining the user's preference more quickly and a method for controlling thereof may be provided.

In addition, the electronic apparatus and the method for controlling thereof according to an embodiment of the disclosure may reduce an error caused by a difference in content of the website when classifying a website accessed by the user into a specific category. Accordingly, an electronic apparatus capable of providing more accurate user-customized information and a method for controlling thereof may be provided.

A process of calculating a preference will be described with reference to exemplary data shown in FIGS. 3A-3D.

Figure 3B:
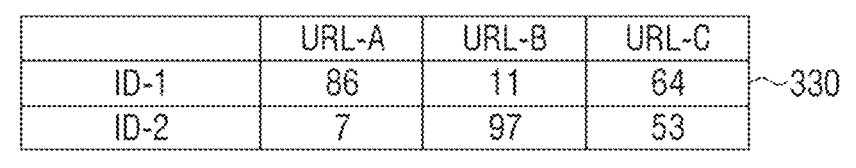

For example, as shown in FIG. 3A and FIG. 3B, it may be assumed and described that A number included in a probability value table 310, a classification result table 320, and a URL access count table for each user 330 will be assumed and described.

The probability value table 310 may probability values that each of website A (URL-A), website B (URL-B), and website C (URC-C) belong to category a (cat-a) and category b (cat-b). As an example, the probability that website A (URL-A) belongs to category a (cat-a) may be "0.849", and the probability that website A (URL-A) belongs to category b (cat-b) may be "0.116".

The classification result table 320 may include a classification result value in which the probability value of the probability value table 310 is filtered by a threshold value. When the threshold value is "0.5", a probability value smaller than the threshold value may be processed as a classification value of "0". As an example, a result of classification in which website A (URL-A) is classified in category a (cat-a) may be "0.849", and a result of classification that website A (URL-A) is classified in category b (cat-b) may be "0".

The URL access count table for each user 330 may include the number of times the first user (ID-1) and the second user (ID-2) accessed website A (URL-A), website B (URL-B), and website C (URC-C), respectively. As an example, the number of times the first user (ID-1) accessed website A (URL-A) may be 86 times, and the first user (ID-1) accessed website B (URL-B) may be 11 times, during a preconfigured period.

Referring to FIG. 3C, the user's website access history table 340 may include a ratio of the number of times a user has accessed a website corresponding to a specific URL to the number of times a user has accessed at least one website, calculated by using (1) of Equation 1. As an example, the processor 120 may calculate 0.534 (86/161), which is a rate of 86 accesses to website A, among 161 access times to the entire website accessed by the first user (ID-1) during a preconfigured period (86 times to website A, 11 times to website B, 64 times to website C)

The access history table 350 for at least one website may include, with the respect to a URL corresponding to a specific website calculated by using (1) of Equation 2, a ratio of the number of times a specific user accessed the specific website among all users who accessed the specific website during a preconfigured period. As an example, the processor 120, with respect to the URL corresponding to the website A, calculate "0.925" (86/93), the ratio of 86 times the number of times the first user accessed out of 93 times (86 times for the first user and 7 times for the second user) of all users who accessed website A, during a preconfigured period.

Referring to FIG. 3D, a preference table 360 for category a and a preference table 370 for category b may include user preference of each website for each of the plurality of categories calculated using Equation 3. A preference table 380 may include user preferences for each of the plurality of categories calculated using Equation (3).

As an example, the processor 120 may calculate Freq1 (ID-1, URL-A)×Freq2 (URL-A, ID-1)×Prob (URL-A, cat-a)+Freq1 (ID-1, URL-B)×Freq2(URL-B, ID-1)×Prob (URL-B, cat-a)+Freq1 (ID-1, URL-C)×Freq2(URL-C, ID-1)×Prob (URL-C, cat-a)=0.534×0.925×0.849+0.068×0.102×0+0.398×0.547×0.721=0.419+0+0.157="0.576" as the preference for category a of the first user.

Figure 4A:
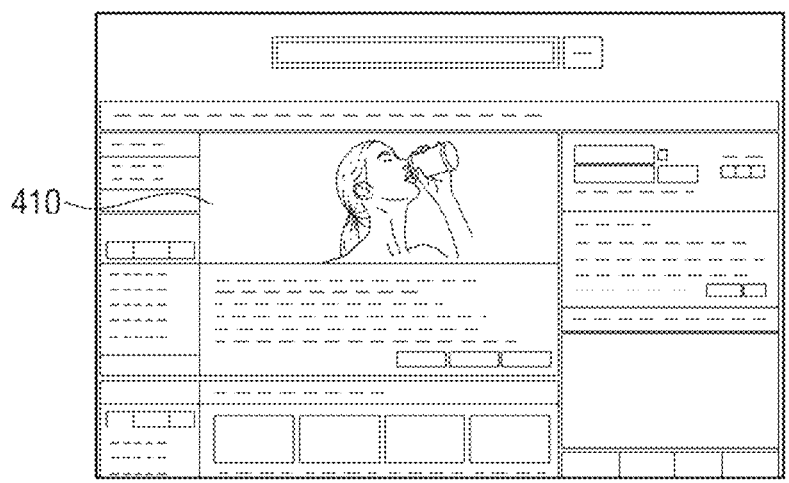
FIGs. 4A and 4B are views illustrating a method of providing information related to a category of a website preferred by a user according to an embodiment.
Figure 4B:
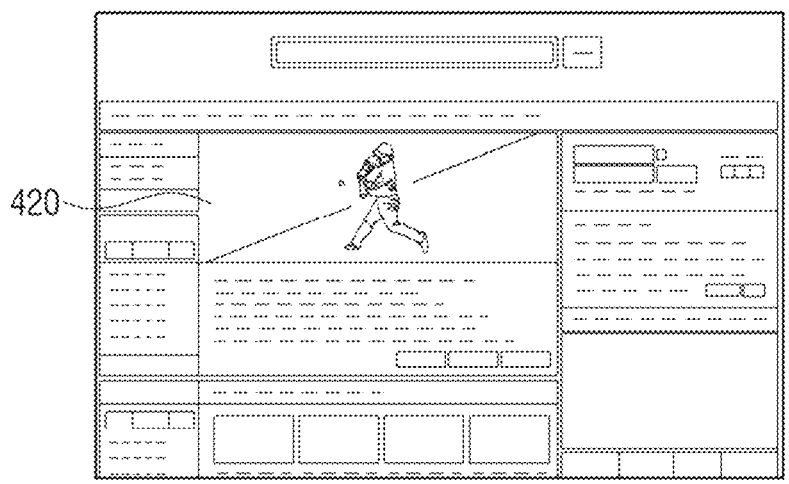

FIG. 4A and 4B are views illustrating a method of providing information related to a category of a website preferred by a user according to an embodiment of the disclosure.

In an embodiment, the processor 120 may provide information related to a category of a website preferred by the user.

Specifically, the processor 120 may determine the category corresponding to the highest preference as the category of the website preferred by the user according to the preference corresponding to each of the plurality of categories, and provide information related to the category of the website preferred by the user to the user's external electronic device. In this case, the information related to the category of the website preferred by the user may include a user-customized advertisement or content based on user preference.

In this case, the processor 120 may preferentially provide information related to the category corresponding to the calculated preference in order of higher preference.

For example, referring to FIGS. 4A and 4B, it is assumed that the category having the highest preference is coffee, and the category having the second highest preference is baseball.

Based on the calculated preference, the processor 120 may determine that beverage, which is the category corresponding to the highest preference, is a first preference category of the website preferred by the first user, and determine that baseball, which is the category corresponding to the second highest preference, is a second preference category of the website preferred by the first user.

In addition, when a signal that the first user requests a website is received, as shown in FIG. 4A, the processor 120 may transmit information related to the category of the website preferred by the user such that an image (advertisement, etc.) related to coffee, which is the first preference category, is displayed on an advertisement banner 410 of the website, to the user's external electronic device with priority.

Thereafter, when the signal for requesting the web page from the first user is received again, the processor 120 may transmit information related to the category of the website preferred by the user such that an image (advertisement, etc.) related to coffee, which is the second preference category, on the advertisement banner 420 of the website, to the external electronic device of the first user.

Meanwhile, FIGS. 4 (a) and (b) is illustrated as an advertisement banner of the same website, but this is only an embodiment, and other websites (e.g., search engine, portal site, news, application store, VOD service screen, etc.) may also be an advertisement banner.

Meanwhile, it has been described that the processor 120 provides information related to the category of the website preferred by the user to the user's external electronic device, but this is only an example, and the processor 120 may be able to provide the information to the electronic apparatus 100 of the disclosure, and may also be able to provide it to the user's external electronic apparatus through another intermediate device.

Figure 5:
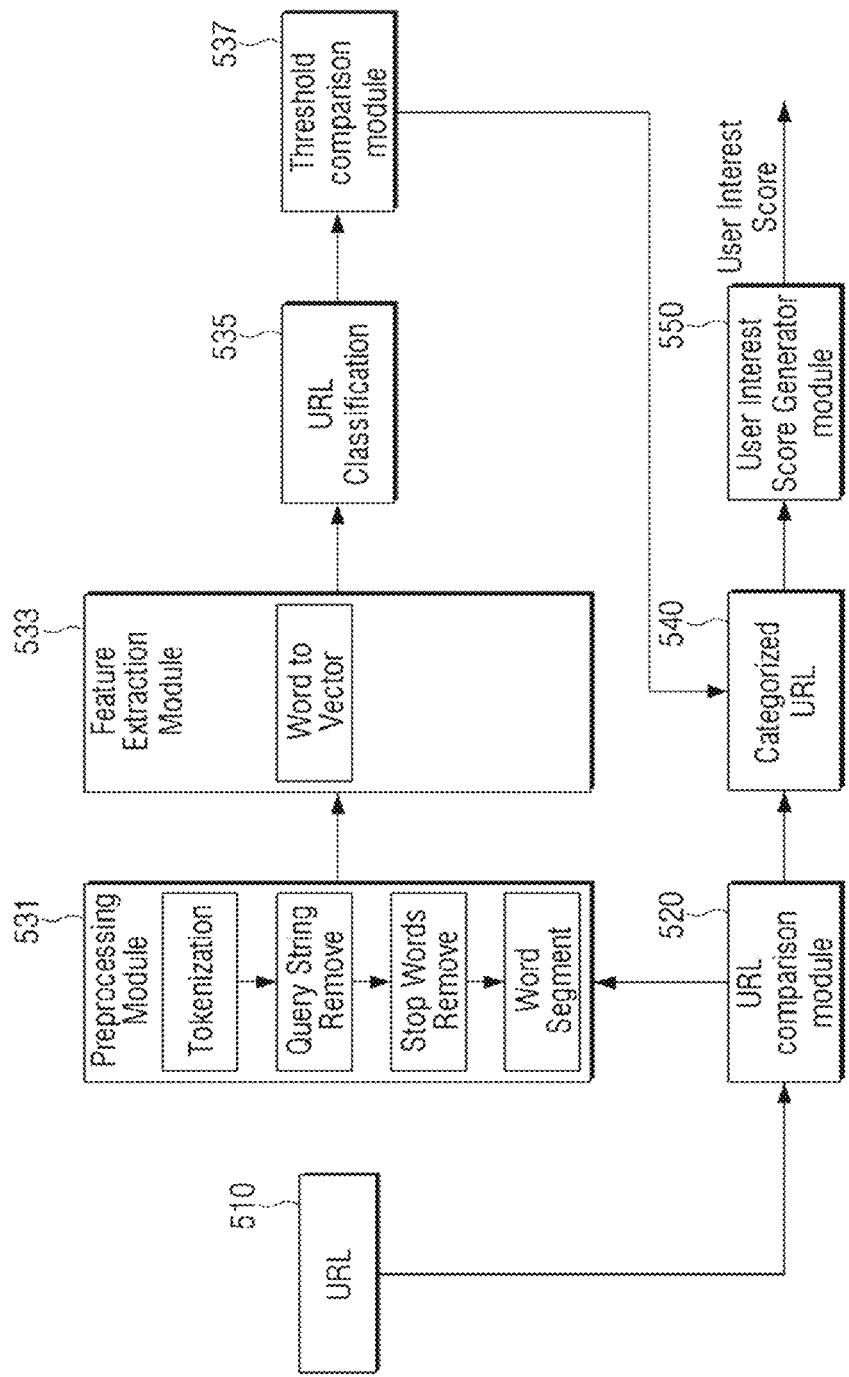
FIG. 5 is a view illustrating a pipeline according to an embodiment.

FIG. 5 is a view illustrating a pipeline according to an embodiment of the disclosure.

Referring to FIG. 5, the processor 120 may include a URL comparison module 520, a preprocessing module 531, a feature extraction module 533, a URL classification module 535, a threshold value comparison module 537, a category classification module 540, a user interest score generation module 550, and each module included in the processor 120 may perform an operation according to a pipeline of FIG. 5. However, this is only an example, and such modules may be classified and stored in the memory 110, and the processor 120 may perform an operation according to a command included in each module.

Hereinafter, for convenience of description, it is assumed that each module included in the processor 120 performs an operation.

When a URL 510 corresponding to a website accessed by the user is received from an external electronic device, the URL comparison module 520 determines whether the received URL 510 matches a URL stored in the memory 110. In this case, the URL may be classified according to a plurality of categories, and probability values for each of the URL and the plurality of categories corresponding to the URL may be previously stored in the memory 110, As an embodiment, when the received URL 510 matches the URL stored in the memory 110, the URL comparison module 520 may search for a URL matching the received URL 510 among the plurality of URLs stored in the memory 110, obtain a probability value for the category matching the searched URL, and classify the received URL 510 into categories matching the searched URL.

As another embodiment, when the received URL 510 does not match the URL stored in the memory 110, the description of operations S220, S230, S240, and S250 of FIG. 2 may be identically applied. Specifically, the preprocessing module 531 may acquire at least one token from the received URL 510 based on a symbol included in the received URL 510. The preprocessing module 531 may remove a query string and a preconfigured word from at least one token. The preprocessing module 531 may divide the query string and the token from which the preconfigured word has been removed into at least one segment based on corpus. Meanwhile, this is only an example, and each operation performed by the preprocessing module 531 may be classified into separate modules and performed.

In this case, the feature extraction module 533 may acquire a feature value for at least one segment classified in the preprocessing module 531, the URL classification module 535 may use the feature value acquired in the feature extraction module 533 as input data with respect to the learned classification model to acquire a probability value to which the URL belongs according to the plurality of categories, the threshold value comparison module 537 may compare the probability value acquired from the URL classification module 535 with the threshold value, and the category classification module 540 may classify a category having a probability value greater than or equal to the threshold value as a category for the received URL 510 as a result of comparison by the URL classification module 535 (S537).

In the embodiment described above, when the URL 510 received by the category classification module 540 is classified (S540), the user interest score generation module 550 may calculate the user's preference for each of the plurality of categories based on the user's website access history, access history to at least one website during the preconfigured period, and the result of classification during the preconfigured period.

Meanwhile, the category classification module 540, when the received URL 510 does not match the URL stored in the memory 110, if the received URL 510 is classified as a category (S540), the classified URL and a probability value corresponding to the URL may be stored in the memory 110 or updated.

As described above, the electronic apparatus and the method for controlling thereof according to an embodiment of the disclosure can improve processing speed and reduce resource consumption when classifying a website accessed by a user into a specific category. Accordingly, an electronic apparatus capable of determining the user's preference more quickly and a method for controlling thereof may be provided.

Figure 6:
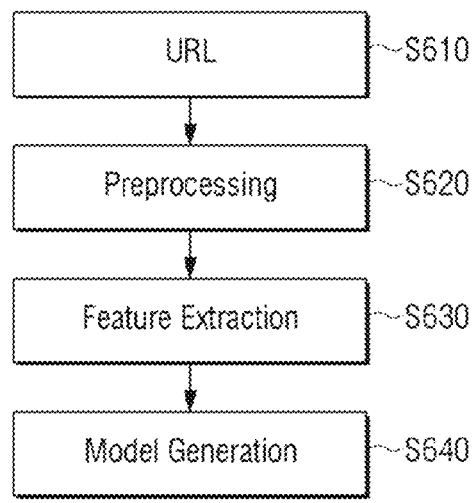
FIG. 6 is a view illustrating a method of generating an artificial intelligence model according to an embodiment.

FIG. 6 is a view illustrating a method for generating (or learning) an artificial intelligence model according to an embodiment of the disclosure.

Referring to FIG. 6, when information on a plurality of URLs and a category to which each of the plurality of URLs belongs is received, the processor 120 may acquire a probability value of the plurality of URLs and the category to which each of the plurality of URLs belongs (S610).

The processor 120 may divide each of the plurality of URLs into at least one segment as a pre-processing operation (S620). This may be applied identically to the description of operations S220, S230, S240, and S250 of FIG. 2 described above.

Specifically, the processor 120 may acquire at least one token from the received URL based on the symbol included in the received URL. The processor 120 may remove a query string and a preconfigured word from at least one token. The processor 120 may divide the query string and the token from which the preconfigured word has been removed into at least one segment based on corpus.

The processor 120 may acquire a feature value for at least one segment (S630), and use the feature value as input data to generate a learned classification model for outputting a probability value preconfigured as a category to which each of the plurality of URLs belongs (S640).

Figure 7A:
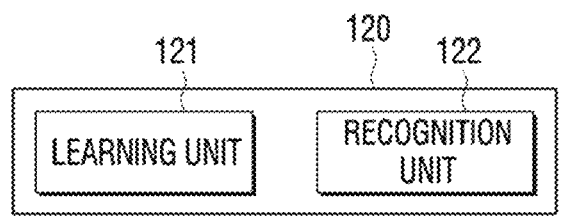
FIGS. 7A to 7C are block diagrams illustrating a learning unit and a recognition unit according to an embodiment.
Figure 7B:
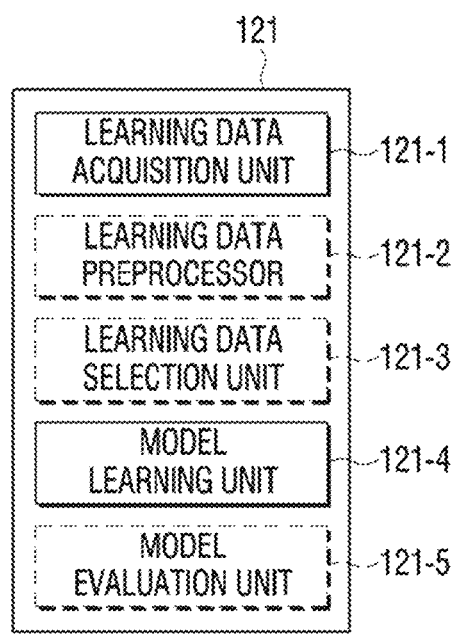
Figure 7C:
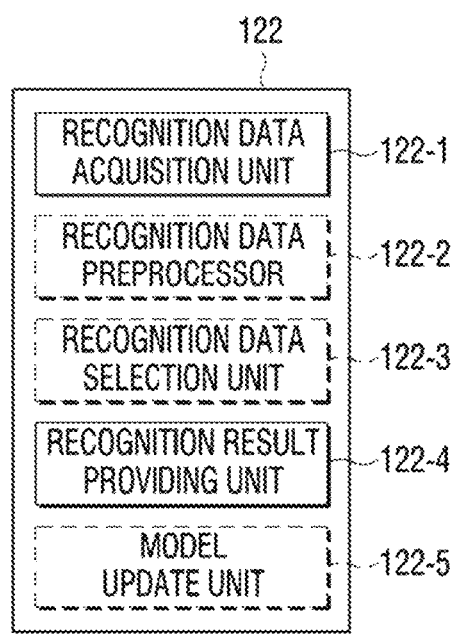

FIGS. 7A to 7C are block diagrams illustrating a learning unit and a recognition unit according to an embodiment of the disclosure.

Referring to FIG. 7A, the processor 120 may include at least one of a learning unit 121 and a recognition unit 122. In this case, the processor 120 may correspond to the processor 120 of the electronic apparatus 100 of the disclosure or a processor of a data learning server.

The learning unit 121 may generate or learn a classification model having a criterion for classifying URLs (or segments) into categories.

For example, the learning unit 121 may use learning data such as information in which the URL is classified as a category, through the information where the URL is classified as a category or classification model such as ODP, to learn or update a classification model having a criterion for determining which category a URL belongs to.

The recognition unit 122 may estimate a category to which the URL belongs by using data corresponding to the URL as input data of the learned classification model.

As an example, the recognition unit 122 may use a feature value for at least one segment included in the URL as input data of the learned classification model to acquire (or estimate, infer) a probability value for the category to which the URL belongs.

At least a portion of the learning unit 121 and at least a portion of the recognition unit 122 may be implemented as a software module or manufactured in the form of at least one hardware chip and mounted on an electronic apparatus. For example, at least one of the learning unit 121 and the recognition unit 122 may be manufactured in the form of a dedicated hardware chip for artificial intelligence (AI), or an existing general-purpose processor (e.g., CPU or application processor) or a graphics dedicated processor (e.g., GPU), and mounted on various electronic apparatuses or object recognition devices described above. In this case, the dedicated hardware chip for artificial intelligence is a dedicated processor specialized in probability calculation, and has higher parallel processing performance than existing general-purpose processors, such that it can quickly process calculation operations in artificial intelligence fields such as machine learning. When the learning unit 121 and the recognition unit 122 are implemented as a software module (or a program module including an instruction), the software module may be stored in a non-transitory readable recording medium that can be read by a computer. In this case, the software module may be provided by an operating system (OS) or may be provided by a predetermined application. Alternatively, some of the software modules may be provided by an operating system (OS), and some of the software modules may be provided by a predetermined application.

In this case, the learning unit 121 and the recognition unit 122 may be mounted on one electronic apparatus, or may be mounted on separate electronic apparatuses, respectively. For example, one of the learning unit 121 and the recognition unit 122 may be included in the electronic apparatus 100 of the disclosure, and the other may be included in an external server. In addition, the learning unit 121 and the recognition unit 122 may perform wired/wireless communication to provide model information constructed by the learning unit 121 to the recognition unit 122, or data input to the recognition unit 122 may be provided to the learning unit 121 as additional learning data.

Referring to FIG. 7B, the learning unit 121 according to an embodiment may include a learning data acquisition unit 121-1 and a model learning unit 121-4. In addition, the learning unit 121 may selectively further include at least one of a learning data preprocessor 121-2, a learning data selection unit 121-3, and a model evaluation unit 121-5.

The learning data acquisition unit 121-1 may acquire learning data necessary for a classification model for classifying URLs (or segments) into categories. In an embodiment of the disclosure, the learning data acquisition unit 121-1 may acquire at least one of an entire image including an object, an image corresponding to an object area, object information, and context information as learning data. The learning data may be data collected or tested by the learning unit 121 or a manufacturer of the learning unit 121.

The model learning unit 121-4 may learn the classification model to have a criterion for determining how to classify URLs (or segments) into categories using the learning data. For example, the model learning unit 121-4 may learn the classification model through supervised learning using a part of the learning data as a criterion for determination. As another example, the model learning unit 121-4 may learn the classification model through unsupervised learning which finds criteria for determining circumstances by learning data without further guidance. As another example, the model learning unit 121-4 may learn the classification model through reinforcement learning which uses feedback on whether the result of the circumstances determination according to learning is correct. In addition, the model learning unit 121-4, for example, may learn a classification model using a learning algorithm including an error back-propagation method or a gradient descent method, etc.

In addition, the model learning unit 121-4 may learn criteria for which learning data to use in order to classify the URLs (or segments) by using input data.

Further, when the classification model is learned, the model learning unit 121-4 may store the learned classification model. In this case, the model learning unit 121-4 may store the learned classification model in the memory 110 of the electronic apparatus 100. Alternatively, the model learning unit 121-4 may store the learned classification model in a memory of a server connected to the electronic apparatus 100 through a wired/wireless network.

The learning unit 121 may further include a learning data preprocessor 121-2 and a learning data selection unit 121-3 in order to improve the result of recognition of the classification model or to save resources or time required in generating the classification model.

The preprocessor 121-2 may pre-process acquired data such that the acquired data can be used for learning to determine circumstances. The learning data preprocessor 121-2 may process the acquired data into a predetermined format so that the model learning unit 121-4 can use the acquired data for learning to determine circumstances.

The learning data selection unit 121-3 may select data necessary for learning from data acquired by the learning data acquisition unit 121-1 or data preprocessed by the learning data preprocessor 121-2. The selected learning data may be provided to the model learning unit 121-4. The learning data selection unit 121-3 may select data necessary for learning from data acquired according to predetermined criteria, or preprocessed data. In addition, the learning data selection unit 121-3 may select data according to predetermined criteria by learning of the model learning unit 121-4.

The learning unit 121 may further include a model evaluation unit 121-5 in order to improve the recognition result of the data classification model.

The model evaluation unit 121-5 may input evaluation data to a classification model, and if the recognition result output from the evaluation data does not satisfy predetermined criteria, allow the model learning unit 121-4 to learn again. In this case, the evaluation data may be predefined data for evaluating the classification model.

For example, if the number or the ratio of the evaluation data whose recognition result is not accurate among the recognition results of the learned classification model for the evaluation data exceeds a predetermined threshold value, the model evaluation unit 121-5 may evaluate that predetermined criteria are not satisfied.

Meanwhile, when there are a plurality of learned data recognition models, the model evaluation unit 121-5 may evaluate whether each of the learned classification models satisfies the predetermined criteria and determine the model which satisfies the predetermined criteria as the final classification model. In this case, when there are a plurality of models satisfying the predetermined criteria, the model evaluating unit 121-5 may determine any one or a predetermined number of models previously set in descending order of the evaluation score as the final classification model.

Referring to FIG. 7C, the recognition unit 122 according to an embodiment may include a recognition data acquisition unit 122-1 and a recognition result providing unit 122-4.

In addition, the recognition unit 122 may selectively further include at least one of a recognition data preprocessor 122-2, a recognition data selection unit 122-3, and a model update unit 122-5.

The recognition data acquisition unit 122-1 may acquire data to determine circumstances. The recognition result providing unit 122-4 may determine circumstances by applying the acquired from the recognition data acquisition unit 122-1 to the learned classification model as an input value. The recognition result providing unit 122-4 may provide the recognition result according to the data recognition purpose. The recognition result providing unit 122-4 may acquire a recognition result by applying the data selected by the recognition data preprocessor 122-2 or the recognition data selection unit 122-3 to be described below to the classification model as input values. In addition, the recognition result may be determined by the data recognition model.

The recognition unit 122 may further include a recognition data preprocessor 122-2 and a recognition data selection unit 122-3 in order to improve the recognition result of the classification model or to save resources or time for providing the recognition result.

The recognition preprocessor 122-2 may pre-process acquired data such that the acquired data can be used for learning to determine circumstances. The recognition data preprocessor 122-2 may process the acquired data into a predetermined format so that the recognition result providing unit 122-4 can utilize the data acquired to determine circumstances.

The recognition data selection unit 122-3 may select data necessary for determination circumstances among data acquired by the recognition data acquisition unit 122-1 or data preprocessed by the recognition data preprocessor 122-2. The selected data may be provided to the recognition result providing unit 122-4. The recognition data selection unit 122-3 may select some or all of the acquired or preprocessed data according to a predetermined selection criterion for determining circumstances. In addition, the recognition data selection unit 122-3 may select data according to the criteria predetermined by learning of the model learning unit 121-4.

The model update unit 122-5 may control the classification model to be updated based on an evaluation of the recognitions result provided by the recognition result providing unit 122-4. For example, the model update unit 122-5 provides the recognition result provided by the recognition result providing unit 122-4 to the model learning unit 121-4, so that the model learning unit 121-4 may request to additionally learn or update the classification model.

Figure 8:
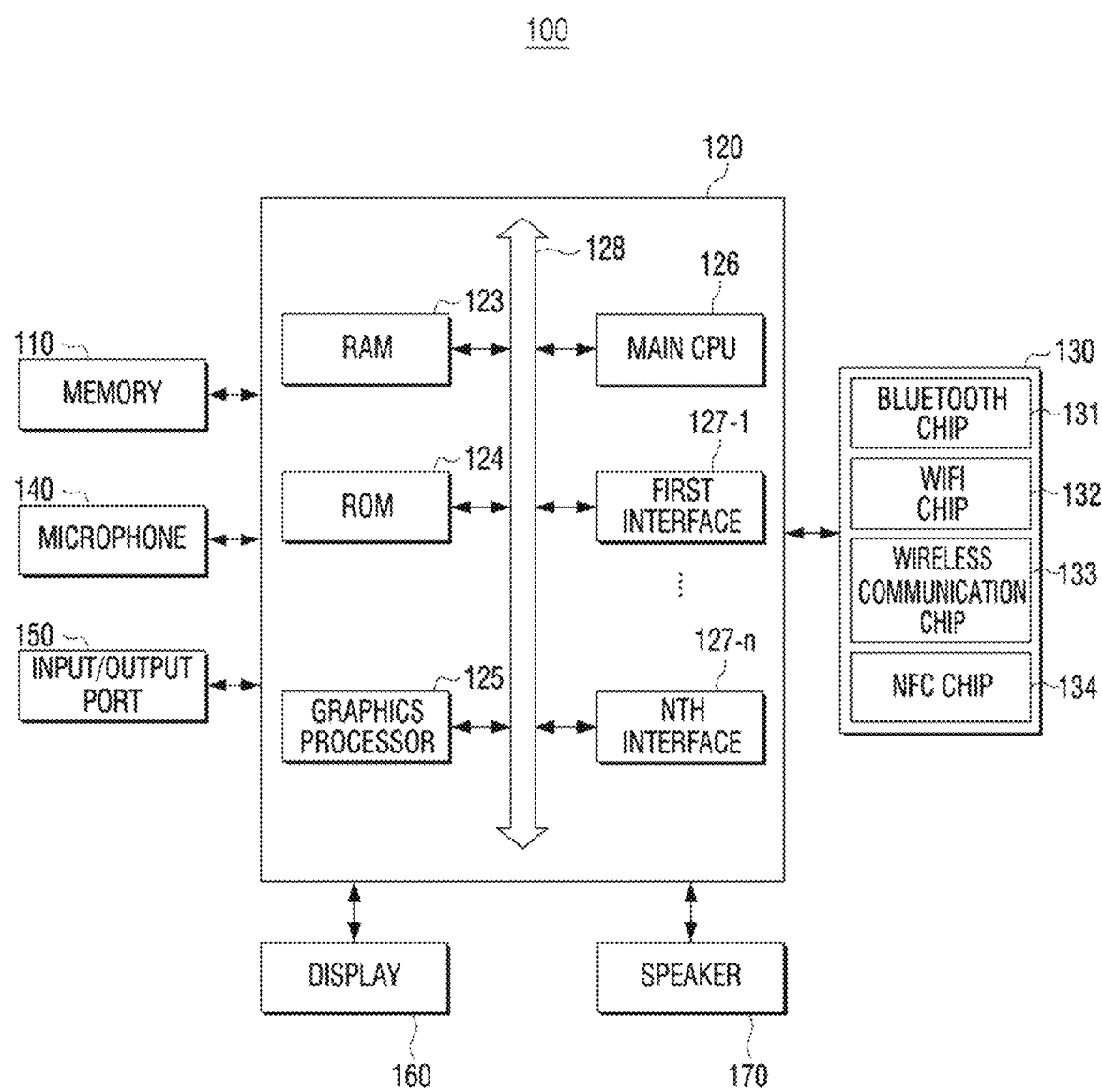
FIG. 8 is a block diagram illustrating a configuration of an electronic apparatus in detail according to an embodiment.

FIG. 8 is a block diagram illustrating a detailed configuration of an electronic apparatus, according to another exemplary embodiment of the disclosure.

Referring to FIG. 8, the electronic apparatus 100 may include, in addition to the memory 110 and the processor 120, one of a communicator 130, a microphone 140, an input/output port 150, a display 160, and a speaker 170.

The processor 120 may include RAM 123, ROM 124, a graphics processor 125, a main central processor (CPU) 126, first through nth interfaces 127-1 through 127-n, and a bus 128. The RAM 123, the ROM 124, the graphics processor 125, the main CPU 126, and the first to the nth interface 127-1 through 127-n may be interconnected through the bus 128.

The communicator 130 may communicate with various types of external devices according to various manners of communication. The communicator 130 may include at least one of a Bluetooth chip 131 for performing wireless communication, a Wi-Fi chip 132, a wireless communication chip 133 and an NFC chip 134, an Ethernet module (not shown) for performing wired communication (not shown) and a USB module (not shown). In this case, the Ethernet module (not shown) and the USB module (not shown) performing the wired communication may perform communication with external devices through the input/output part 150.

The microphone 140 is built in the electronic apparatus 100 and may directly receive the user's voice, and acquire an audio signal by converting the user's voice, which is an analog signal, to digital by a digital conversion unit (not shown).

The input/output port 150 is configured to connect the electronic apparatus 100 and an external device (not shown) so that the electronic apparatus 100 can transmit and/or receive signals for an external device (not shown) and an image and/or audio.

For this operation, the input/output port 150 may be implemented as a wired port such as an HDMI port, a display port, an RGB port, a digital visual interface (DVI) port, a Thunderbolt, and a component port.

For example, in order for the electronic apparatus 100 to output an image and/or audio, the electronic apparatus 100 may receive a signal for an image and/or voice through the input/output port 150 from an external device (not shown). As another example, the electronic apparatus 100 may transmit a signal for a specific image and/or voice to the external device through the input/output port 150 so that an external device (not shown) can output the image and/or voice.

As such, signals for images and/or audio may be transmitted in one direction through the input/output port 150. However, this is only an embodiment, and the signals for images and/or voice may be transmitted in both directions through the input/output port 150.

The display 160 may display image data processed by an image processor (not shown) on a display area (or display). The display area may mean at least a part of the display 160 exposed on one surface of a housing of the electronic apparatus 100. The display 110 may be implemented in a form of a flexible display form and may be connected to at least one of a front area, a side area, and a rear area of the electronic apparatus 160. Due to a substrate as thin and flexible as a paper sheet, the flexible display may have such characteristic that it can be bent, curved, or rolled without being damaged.

The speaker 170 is built in the electronic apparatus 100 and is configured to output various kinds of alarm sounds or voice messages in addition to various audio data on which various processing operations such as decoding, amplification, and noise filtering are performed by an audio processor.

The input unit (not shown) may receive various user inputs and transmit them to the processor 120. The input unit (not shown) may include, for example, a touch panel, a (digital) pen sensor, or a key. The touch panel may, for example, use at least one of electrostatic type, pressure sensitive type, infrared type, and a ultraviolet type. In addition, a touch panel may further include a control circuit. The touch panel further includes a tactile layer, and it is possible to provide tactile response to the user. The (digital) pen sensor, for example, may be part of a touch panel or include a separate detection sheet. The key, for example, may include a physical button, an optical key, or keypad. Alternatively, the input unit (not shown) may be connected by wire or wirelessly from an external device (not shown) such as a keyboard or a mouse to receive a user input.

FIG. 9 is a view illustrating a flowchart according to an embodiment of the disclosure.

Referring to FIG. 9, a uniform resource locator (URL) corresponding to at least one website accessed by the user during a preconfigured period may be classified into at least one segment (S910). Here, in the operation of classifying, a URL corresponding to each of the at least one website may be classified into at least one segment based on corpus.

The URL may be classified according to a plurality of categories based on at least one segment and the learned classification model (S920). The learned classification model may be learned using information on a plurality of URLs and a category to which each of the plurality of URLs belongs as learning data.

Based on the user's website access history, the access history to at least one website, and the classification result for a preconfigured period, a category of the website preferred by the user among the plurality of categories may be determined (S930).

The operation of determining the category may acquire a feature value for at least one segment, use the feature value as input data for the learned classification model to acquire a probability value that the URL belongs to the plurality of categories, and determine, among a plurality of categories, a category of the website preferred by the user, based on the user's website access history during a preconfigured period, access history of the user who accessed the website, and a probability value.

In an embodiment of the disclosure, for each of the at least one URL, a ratio of the number of times the user has accessed a website corresponding to a specific URL to the number of times the user has accessed at least one website during a preconfigured period, may be calculated as the user's website access history.

In an embodiment of the disclosure, for each of at least one website, the ratio of the number of times the user accessed the website to the total number of users who accessed the website during a preconfigured period, may be calculated as access history for the at least one website.

Meanwhile, in an embodiment of the disclosure, the user's preference for each of a plurality of categories may be calculated based on the user's website access history, the access history to at least one website, and the classification result for a preconfigured period, and based on the calculated preference, a category of the website preferred by the user may be determined.

Meanwhile, in an embodiment of the disclosure, information related to the category of the website preferred by the user may be provided.

According to an embodiment, the various embodiments described above may be implemented as software including instructions stored in a machine-readable storage media which is readable by a machine (e.g., a computer). The device may include the electronic device according to the disclosed embodiments, as a device which calls the stored instructions from the storage media and which is operable according to the called instructions. When the instructions are executed by a processor, the processor may directory perform functions corresponding to the instructions using other components or the functions may be performed under a control of the processor. The instructions may include code generated or executed by a compiler or an interpreter. The machine-readable storage media may be provided in a form of a non-transitory storage media. The 'non-transitory' means that the storage media does not include a signal and is tangible, but does not distinguish whether data is stored semi-permanently or temporarily in the storage media.

In addition, according to an embodiment, the methods according to various embodiments described above may be provided as a part of a computer program product. The computer program product may be traded between a seller and a buyer. The computer program product may be distributed in a form of the machine-readable storage media (e.g., compact disc read only memory (CD-ROM) or distributed online through an application store (e.g., PlayStore™). In a case of the online distribution, at least a portion of the computer program product may be at least temporarily stored or provisionally generated on the storage media such as a manufacturer's server, the application store's server, or a memory in a relay server.

Each of the components (e.g., modules or programs) according to the various embodiments described above may be composed of a single entity or a plurality of entities, and some subcomponents of the above-mentioned subcomponents may be omitted or the other subcomponents may be further included to the various embodiments. Generally, or additionally, some components (e.g., modules or programs) may be integrated into a single entity to perform the same or similar functions performed by each respective component prior to integration. Operations performed by a module, a program module, or other component, according to various exemplary embodiments, may be sequential, parallel, or both, executed iteratively or heuristically, or at least some operations may be performed in a different order, omitted, or other operations may be added.

What is claimed is:

1. An electronic apparatus comprising:
a memory including at least one command; and
a processor configured to be connected to the memory so as to control the electronic apparatus,
wherein the processor is configured to execute at least one instruction, so as to classify a uniform resource locator (URL) corresponding to at least one website accessed by a user during a predetermined period into at least one segment,
classify URLs according to a plurality of categories, based on at least one segment and a learned classification model, and
determine, among the plurality of categories, a category of a website preferred by the user, based on the user's website access history during the predetermined period, an access history with respect to the at least one website during the predetermined period, and a result of the classification,
wherein the processor is configured to:
calculate, with respect to a respective one or more URLs, a first ratio of the number of accesses of the user who has accessed a website corresponding to a specific URL to the number of accesses of the user who has accessed the at least one website during the predetermined period as the access history with the respect to the website of the user,
calculate, with respect to the respective one or more websites, a second ratio of the number of accesses of the user who has accessed the website to the number of accesses of all users who have accessed the website during the predetermined period as the access history with respect to the at least one website,
calculate a preference with respect to each of the plurality of categories based on the user's website access history during the predetermined period, the access history with respect to the at least one website, the first and the second ratio of the number of accesses of the user, and the result of the classification, and
determine the category of the website preferred by the user based on the calculated preference.

2. The apparatus of claim 1, wherein the processor is configured to classify the URL corresponding to the at least one website respectively into at least one segment, respectively, based on corpus.

3. The apparatus of claim 1, wherein the processor is configured to acquire a feature value with respect to the at least one segment,
use the feature value as an input data with respect to the learned classification model to acquire a probability value that the URLs belongs to the plurality of categories, and
determine, among the plurality of categories, the category of the website preferred by the user, based on the user's website access history during the predetermined period, the access history of the user who access the web site during the predetermined period, and the probability value.

4. The apparatus of claim 1, wherein the processor is configured to provide information related to the category of the website preferred by the user.

5. The apparatus of claim 1, wherein the learned classification model is configured to be learned using information on the plurality of URLs and a category to which each of the plurality of URLs belongs as learning data.

6. A method for controlling an electronic apparatus comprising:
classifying a uniform resource locator (URL) corresponding to at least one website accessed by a user during a predetermined period into at least one segment;
classifying URLs according to a plurality of categories, based on at least one segment and a learned classification model;
calculating, with respect to a respective one or more URLs, a first ratio of the number of accesses of the user who has accessed a website corresponding to a specific URL to the number of accesses of the user who has accessed the at least one website during the predetermined period as the access history with the respect to the website of the user;
calculating, with respect to the respective one or more websites, a second ratio of the number of accesses of the user who has accessed the website to the number of accesses of all users who have accessed the website during the predetermined period as the access history with respect to the at least one website; and
determining, among the plurality of categories, a category of a website preferred by the user, based on the user's website access history during the predetermined period, an access history with respect to the at least one website during the predetermined period, and a result of the classification,
wherein the determining the category includes calculating user's preference with respect to each of the plurality of categories based on the user's website access history during the predetermined period, the access history with respect to the at least one website, the first and the second ratio of the number of accesses of the user, and the result of the classification, and
determining the category of the website preferred by the user on the calculated preference.

7. The method of claim 6, wherein the dividing includes classifying the URL corresponding to the at least one website respectively into at least one segment, respectively, based on corpus.

8. The method of claim 6, wherein the determining includes acquiring a feature value with respect to the at least one segment;
using the feature value as an input data with respect to the learned classification model to acquire a probability value that the URLs belongs to the plurality of categories; and
determining, among the plurality of categories, the category of the website preferred by the user, based on the user's website access history during the predetermined period, the access history of the user who access the web site during the predetermined period, and the probability value.

9. The method of claim 6, further comprising:
providing information related to the category of the website preferred by the user.

* * * * *